(12) United States Patent
Obasanjo et al.

(10) Patent No.: US 9,742,750 B2
(45) Date of Patent: Aug. 22, 2017

(54) ROAMING INTERNET-ACCESSIBLE APPLICATION STATE ACROSS TRUSTED AND UNTRUSTED PLATFORMS

(71) Applicant: Microsoft Corporation, Redmond, WA (US)

(72) Inventors: Dare Obasanjo, Renton, WA (US); Oded Shekel, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/916,543

(22) Filed: Jun. 12, 2013

(65) Prior Publication Data

US 2014/0373096 A1 Dec. 18, 2014

(51) Int. Cl.
*H04L 29/06* (2006.01)
*H04L 29/08* (2006.01)
*H04W 4/00* (2009.01)

(52) U.S. Cl.
CPC ............ *H04L 63/08* (2013.01); *H04L 63/10* (2013.01); *H04L 67/1095* (2013.01); *H04L 67/148* (2013.01); *H04W 4/003* (2013.01)

(58) Field of Classification Search
CPC ..... H04L 63/08; H04L 63/10; H04L 67/1097; H04L 67/1095; H04L 67/148; H04L 63/101; H04W 4/003
See application file for complete search history.

(56) References Cited

U.S. PATENT DOCUMENTS

| 7,509,672 | B1 * | 3/2009 | Horwitz et al. ................. 726/8 |
| 8,812,601 | B2 * | 8/2014 | Hsieh ................... G06F 9/4856 |
| | | | 709/206 |
| 8,869,284 | B1 * | 10/2014 | Mao ..................... G06F 21/563 |
| | | | 726/23 |
| 2003/0217096 | A1 | 11/2003 | McKelvie et al. |
| 2010/0064349 | A1 * | 3/2010 | Randle et al. .................... 726/4 |
| 2012/0166518 | A1 * | 6/2012 | Alev et al. .................... 709/203 |
| 2012/0203862 | A1 | 8/2012 | Tayeb et al. |
| 2013/0066832 | A1 | 3/2013 | Sheehan et al. |

(Continued)

FOREIGN PATENT DOCUMENTS

EP 2372574 A1 10/2011

OTHER PUBLICATIONS

Keulen, Florian Van, "Mobile User Centric Identity through Information Cards", Retrieved at <<https://doc.novay.nl/dsweb/Get/Document-106300>>, In Thesis of Telematics Bachelor, University of Twente, Aug. 2009, pp. 87.

(Continued)

*Primary Examiner* — Jeffrey Pwu
*Assistant Examiner* — William Corum, Jr.
(74) *Attorney, Agent, or Firm* — Jonathan M. Waldman

(57) ABSTRACT

In one embodiment, a user device may store state data for an application at an internet-accessible data storage 124 for access by other devices of the user. The target user device 140 may use an untrusted platform 142 to generate an access request 300 for an application state data set for a source application 114. The target user device 140 may send the access request 300 to the internet-accessible data storage 124. The target user device 140 may send an access credential 330 to the internet-accessible data storage 124.

20 Claims, 9 Drawing Sheets

(56) References Cited

U.S. PATENT DOCUMENTS

| | | |
|---|---|---|
| 2013/0084985 A1 | 4/2013 | Green et al. |
| 2013/0086114 A1* | 4/2013 | Wilson et al. ............... 707/783 |
| 2013/0212652 A1* | 8/2013 | Gbadegesin et al. ............ 726/4 |
| 2014/0095624 A1* | 4/2014 | Quan ............... G06F 17/30085 709/205 |
| 2014/0095625 A1* | 4/2014 | Quan ..................... A63F 13/10 709/205 |
| 2014/0123240 A1* | 5/2014 | Seo et al. .......................... 726/4 |
| 2014/0289333 A1* | 9/2014 | Chan ...................... A63F 13/12 709/204 |

OTHER PUBLICATIONS

Choy, et al., "EdgeCloud: A New Hybrid Platform for On-Demand Gaming", Retrieved at <<https://math.uwaterloo.ca/computer-science/sites/ca.computer-science/files/uploads/files/CS-2012-19.pdf>>, In Technical Report, CS-2012-19, Sep. 2012, pp. 14.

"Implementing Whispersync", Retrieved at <<https://developer.amazon.com/sdk/gamecircle/documentation/whispersync.html>>, Retrieved Date: Apr. 23, 2013, pp. 10.

"Store your Saved Games in the Cloud", Retrieved at <<http://support.xbox.com/en-US/xbox-live/game-saves-in-the-cloud/cloud-save-games>>, Retrieved Date: Apr. 23, 2013, pp. 3.

"International Search Report & Written Opinion for PCT Patent Application No. PCT/US2013/060760", Mailed Date: Mar. 20, 2014, Filed Date: Sep. 20, 2013, 12 Pages.

"Office Action Issued in European Patent Application No. 13776878.4", Mailed Date: Nov. 21, 2016, 5 Pages.

* cited by examiner

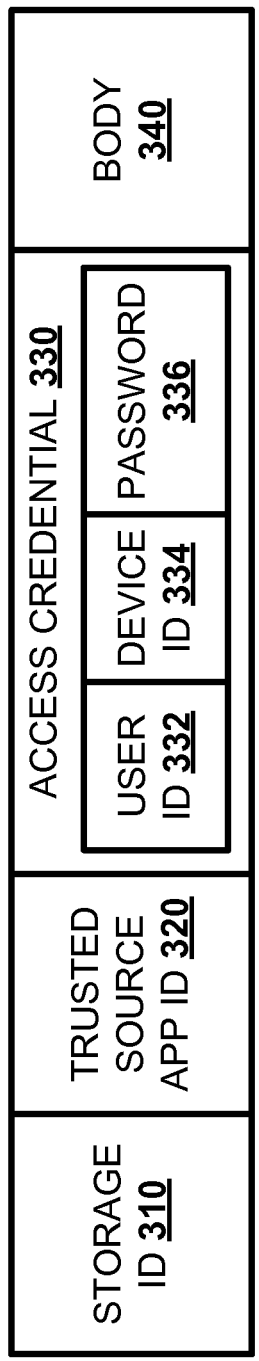
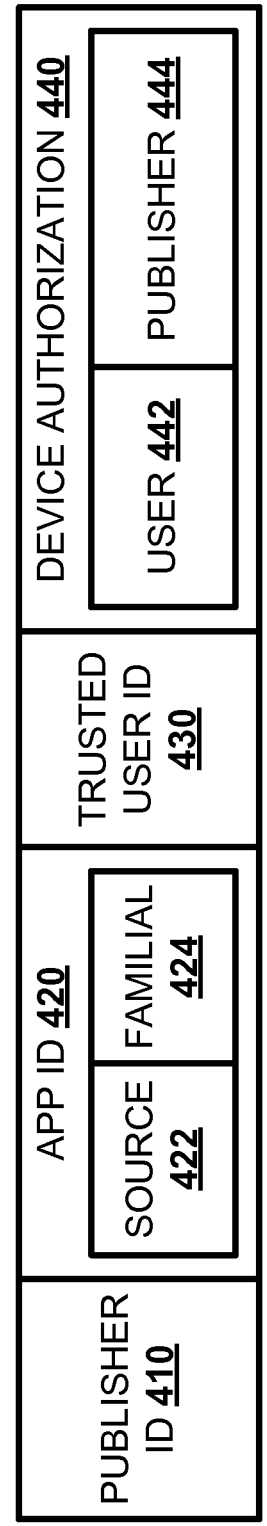

*600*

ROAMING INTERNET-ACCESSIBLE APPLICATION STATE ACROSS TRUSTED AND UNTRUSTED PLATFORMS

BACKGROUND

A user may create a user account with an internet-accessible resource service, such as a cloud service. An internet-accessible resource service interacts with a thin client resident on a user device, outsourcing a computer service to one or more computing devices distributed in a network, referred to as the cloud. An internet-accessible resource service may provide an internet-accessible resource, such as data storage, processing, an application, or other computing services, to a user across multiple user devices. A user may share an internet-accessible resource with other user accounts for the internet-accessible resource service.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to storing state data for an application at an internet-accessible data storage for access by other devices of the user. The target user device may use an untrusted platform to generate an access request for an application state data set for a source application. The target user device may send the access request to the internet-accessible data storage. The target user device may send an access credential to the internet-accessible data storage.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates, in a block diagram, one embodiment of an access request.

FIG. 4 illustrates, in a block diagram, one embodiment of an access control list record.

DETAILED DESCRIPTION

Figure 1:
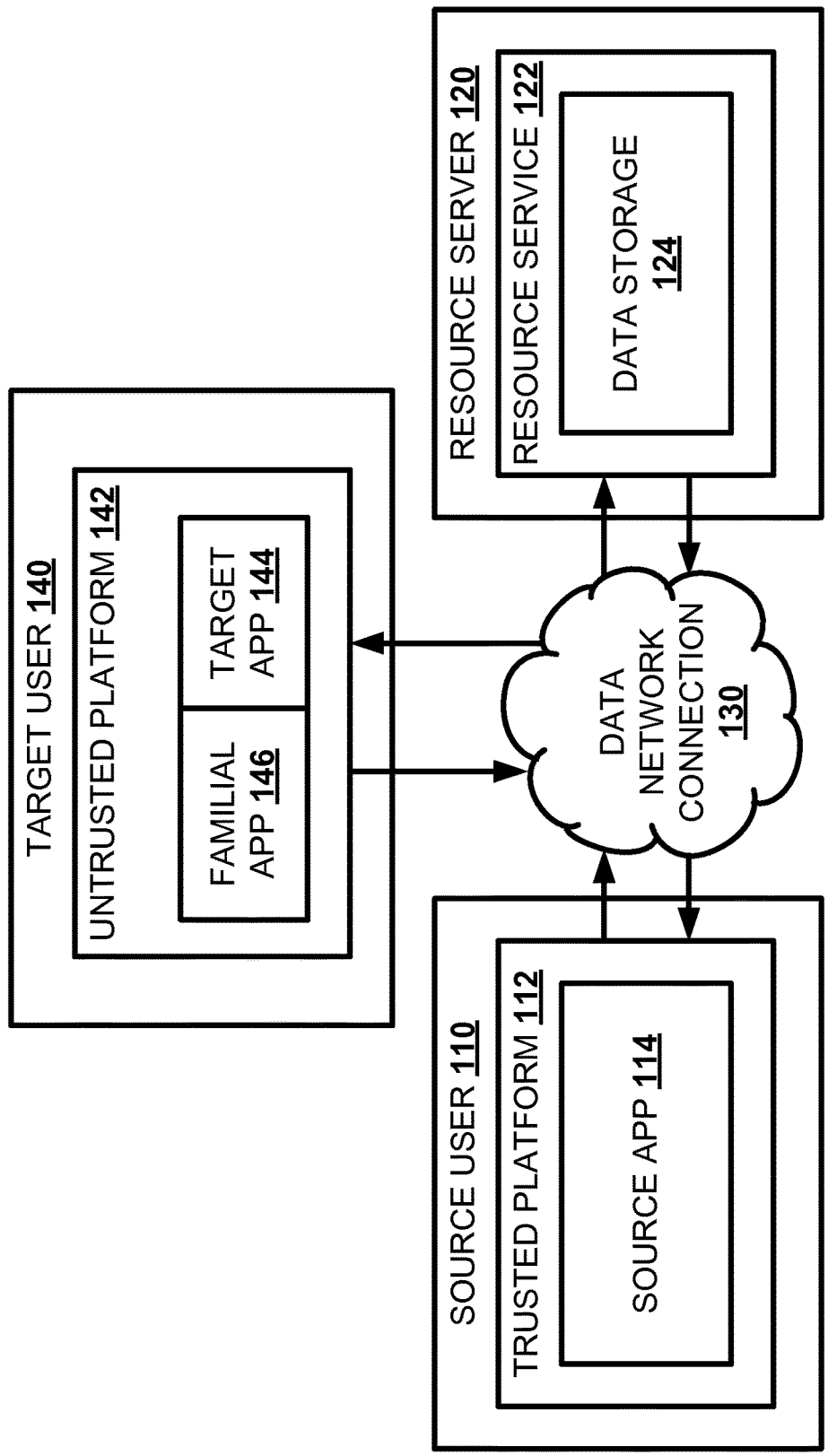
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, a resource server, a source device, or a target device.

A user may operate applications from the same application publisher on multiple devices with a variety of operating systems. For instance, a user may have Angry Birds® on an iPhone® and a Windows 8® laptop. A user may want to have the application be in the same shared state across each device, such as keeping the same game level. Rather than have the developer set up a server that the user has to sign into each time the application is used, the operating system may provide a data storage location for the application state data on an internet-accessible data service. This application state data may then be accessed across devices, as well as with other user approved applications.

The user may operate these applications on a trusted platform, with each application coming from a trusted source. A trusted platform is an operating system verifiable with a trusted source, such as an application store. An application store is a digital online platform for distributing application software. As part of registering the application, the application publisher may choose if the application state data is accessible from instances of the application operating in untrusted platforms. An untrusted platform is an operating system unverified by a trusted source. The untrusted platform may be an operating system produced by a different software vendor than the operating system on the first device, with applications unverified by the application store. The trusted source may sign the application binary in a way verifiable in a trusted manner when running on the trusted platform.

In addition, the application publisher may choose whether to share application state data between applications from that application publisher. A unique application identifier may identify the applications, while a unique publisher identifier may identify the application publisher. An application with access to the application state data may be referred to as a familial application.

The trusted source may sign an application binary in a way verifiable in a trusted manner when running on a trusted platform. When the application is running on the trusted platform, the application may make system calls as network requests to retrieve data from an internet-accessible data storage to access application state data stored for that user. Verifying the signed binary may determine the application identity to ensure the familial application may access application state data on the trusted platform. The user identity may be determined by authenticating the user with the operating system via standard authentication methods.

When the application is storing data when running on the target platform, the application may store data in a shared location visible to other applications specified during registration. Similarly the application may read data from shared locations belonging to other applications that have granted access.

Placing the publisher identifier and application identifier of the application as part of the application binary in a cryptographically secure manner may ensure access to the application state data. The application may encode the application identifier and publisher identifier of those granted access. The application may compare the identifiers before allowing an application to read or write shared data.

On an untrusted platform, the application may input an application identifier to a web based application programming interface (API) obtained upon registration with the trusted application source. The application programming interface may authenticate the user via a traditional delegated authorization model. The application programming interface may ask the user if the application identified by the specified moniker is allowed to access the application state data. If the user assents, then the application programming interface may return an access token for accessing the application state data on the untrusted platform.

A user may share access to the application state data with other users. A user with access to the application state data may add another user to a list of trusted users. The trusted user list may be managed by the originating user, or may be co-owned among each user with access to the application state data. The originating user may send an invitation to the added user indicating that the application state data is available. Once added to the trusted user list, the added user may access the application state data by providing a user credential identifying the user. For example, spouses may share a reading list for a web browser.

Thus, in one embodiment, a user device may store state data for an application at an internet-accessible data storage for access by other devices of the user. The target user device may use an untrusted platform to generate an access request for an application state data set for a source application. The target user device may send the access request to the internet-accessible data storage. The target user device may send an access credential to the internet-accessible data storage. A processor of the target user device may execute a target application and a familial application on the untrusted platform. A resource server may store the application state data set for the application in an internet-accessible data storage. The resource server may receive an access request for the application state data set from the untrusted platform on the target user device.

FIG. 1 illustrates, in a block diagram, one embodiment of a resource network 100. A user device, referred to in this interaction a source user device 110, may execute a trusted platform 112 that connects to one or more resource servers 120 executing an internet-accessible resource service 122 via a data network connection 130. The data network connection 130 may be an internet connection, a wide area network connection, a local area network connection, or other type of data network connections. A trusted platform 112 is an operating system or other software program that may access the internet-accessible resource service 122 without using further validation or authorization. Often, the trusted platform 112 may be integrated with the internet-accessible resource service 122. The source user device 110 may be executing an application, referred to in this interaction as a source application 114, on the trusted platform 112. The internet-accessible resource service 122 may manage one or more internet-accessible resources, such as an internet-accessible data storage 124. The source application 114 may automatically back up any state data used to properly execute the source application 114 to an internet-accessible data storage 124 located with the internet-accessible resource service 122. The internet-accessible resource service 122 may allocate the internet-accessible data storage 124 to store the state data for the source application 114.

A second user device, referred to in this interaction as a target user device 140, may also connect to the internet-accessible resource service 122 via a data network connection 130. The target user device 140 may also execute a trusted platform 112 or an untrusted platform 142. An untrusted platform 142 is an operating system or other software program that may access the internet-accessible resource service 122 after further validation and security measures. The further validation may be a password or the confirmation of a text message sent to a source user device 110 executing a trusted platform 112. Often, the untrusted platform 142 may have been produced by a different publisher than the internet-accessible resource service 122.

The target user device 140 may be executing on the untrusted platform 142 the same application as the source application 114 on the trusted platform 112, referred to in this interaction as the target application 144. The target application 144 on the target user device 140 may retrieve any state data stored in the internet-accessible data storage 124 by the source application 114 on the source user device 110. The target user device 140 and target application 144 in this interaction may be a source user device 110 and a source application 114 in a different interaction.

Further, the target user device 140 may be executing on the untrusted platform 142 a familial application 146 that may also access the application state data set stored in the internet-accessible data storage 124 by the source application 114 on the source user device 110. A familial application 146 is an application different from the source application 114 with access to the application state data set. The familial application 146 may be similar to the target application 144, possibly even produced by the same application publisher. For example, a user running Angry Birds® on an Apple iPhone® may access state data for Angry Birds Seasons® on a Microsoft Surface®. The familial application 146 may be a source application 114 or a target application 144 in a different interaction.

Figure 2:
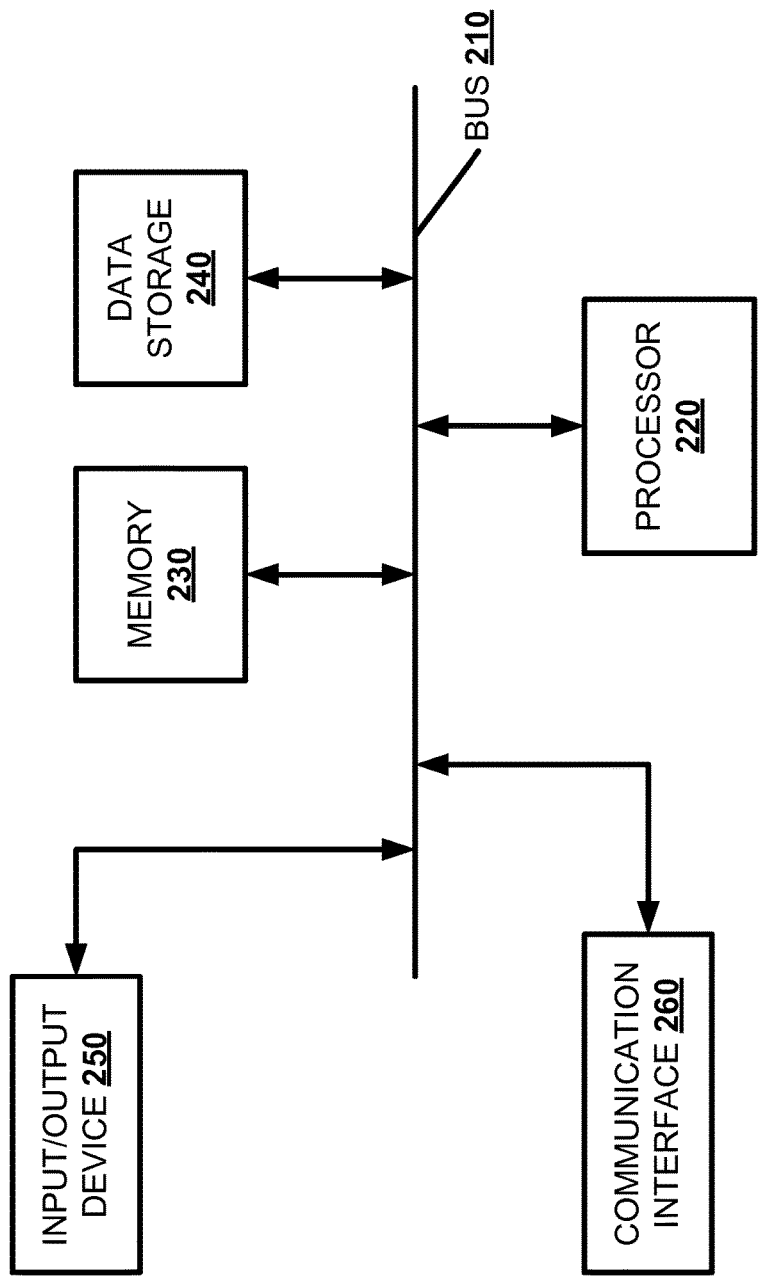
FIG. 2 illustrates, in a block diagram, one embodiment of a computing device.

FIG. 2 illustrates a block diagram of an exemplary computing device 200 which may act as a source user device 110, a target user device 140, or a resource server 120. The computing device 200 may combine one or more of hardware, software, firmware, and system-on-a-chip technology to implement a source user device 110, a target user device 140, or a resource server 120. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing an application state data set or an access control list.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

A target user device 140 may request access to an application state data set, either to download the latest version or to update with any changes made. FIG. 3 illustrates, in a block diagram, one embodiment of an access request 300. The access request 300 may have a storage identifier 310 that identifies the storage location of the application state data set. The access request 300 may have an application identifier 320 provided by a trusted source. The trusted source may be an application store verified by the publisher providing the internet-accessible resource service 122. The access request 300 may have an access credential 330 that the internet-accessible resource service 122 may use to verify the access request 300. The access credential 330 may have a user identifier 332 indicating the user making the access request 300. The access credential 330 may have a device identifier 334 identifying the user device receiving the application state data set. The access credential 330 may have a password 336 provided by the user to confirm the identity of the user. The access credential 330 may be sent as part of the access request 300 or may be sent separately in response to a credential challenge. The access request 340 may have a body section 340. The body section 340 may contain a request to download the application state data or the latest update of the application state data. Alternately, the body section 340 may contain an update to the application state data from the user device running the application.

The internet-accessible resource service 122 may maintain an access control list to determine which applications running on which user devices may access the application state data. FIG. 4 illustrates, in a block diagram, one embodiment of an access control list record 400. The access control list record 400 may have a publisher identifier 410 indicating the publisher or publishers of the applications with state data stored at the internet-accessible data storage 124. The access control list record 400 may have one or more application identifiers 420, indicating the applications with access to state data stored at the internet-accessible data storage 124. The application identifiers 420 may be source application identifiers 422 and familial application identifiers 424. The access control list record 400 may have a list of one or more trusted user identifiers 430, indicating users granted access to the application state data set. The access control list record 400 may have a device authorization 440, indicating which devices of the user may have access to the application state data set. The device authorization 440 may combine a user authorization 442 and a publisher authorization 444. A user authorization 442 may indicate that a user has authorized a user device to access the application state data. A publisher authorization 444 may indicate that the application publisher has authorized an application that operates on the user device type to access the application state data. The publisher authorization 444 may be used as a check to prevent a malicious application from "spoofing" a legitimate application to access the application state data.

Figure 5:
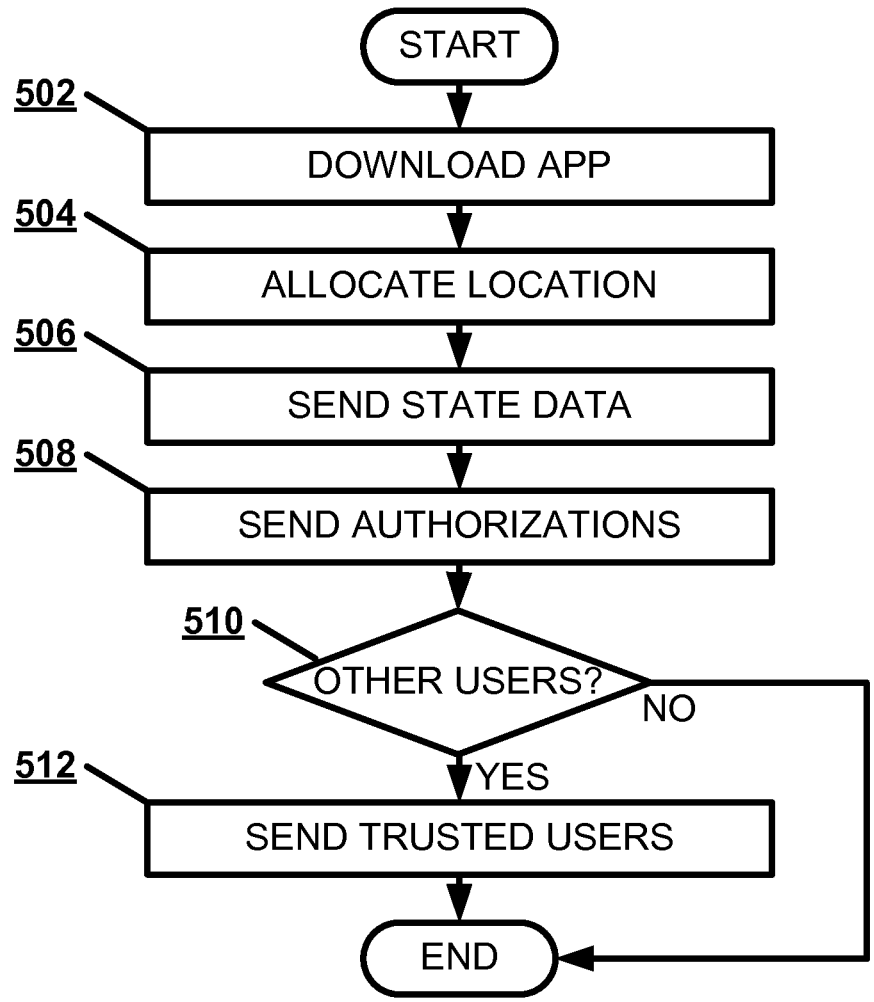
FIG. 5 illustrates, in a flowchart, one embodiment of a method of creating a state data storage location with a source user device.

FIG. 5 illustrates, in a flowchart, one embodiment of a method 500 of creating a state data storage location with a source user device 110. The source user device 110 may download a source application 114 from an application store (Block 502). The source user device 110 may allocate a data location in the internet-accessible data storage 124 (Block 504). The source user device 110 may send an application state data set to the internet-accessible data storage 124 for storage (Block 506). The source user device 110 may send a device authorization 440 to the internet-accessible data storage 124 for inclusion in the access control list (Block 508). If the user decides to grant access to the application state data set to other users (Block 510), the source user device 110 may send a trusted user list 430 to the internet-accessible data storage 124 for inclusion in the access control list (Block 512).

Figure 6:
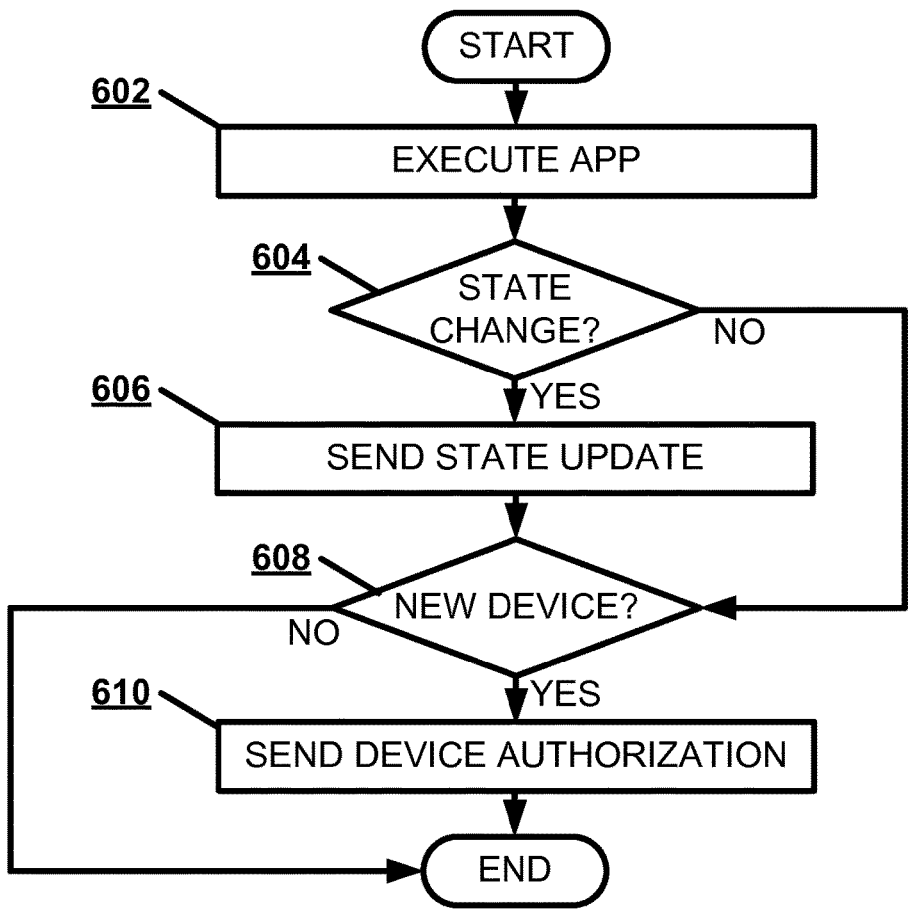
FIG. 6 illustrates, in a flowchart, one embodiment of a method of storing an application state data set at an internet-accessible storage data with a source user device.

FIG. 6 illustrates, in a flowchart, one embodiment of a method 600 of storing an application state data set at an internet-accessible data storage 124 with a source user device 110. The source user device 110 may execute a source application 114 on a trusted platform 112 (Block 602). If the source application 114 changes the application state data (Block 604), the source user device 110 may send an updated application state data set to the internet-accessible data storage 124 (Block 606). If the user adds the application to a new device (Block 608), the source user device 110 may send a device authorization to the internet-accessible data storage 124 (Block 610).

Figure 7:
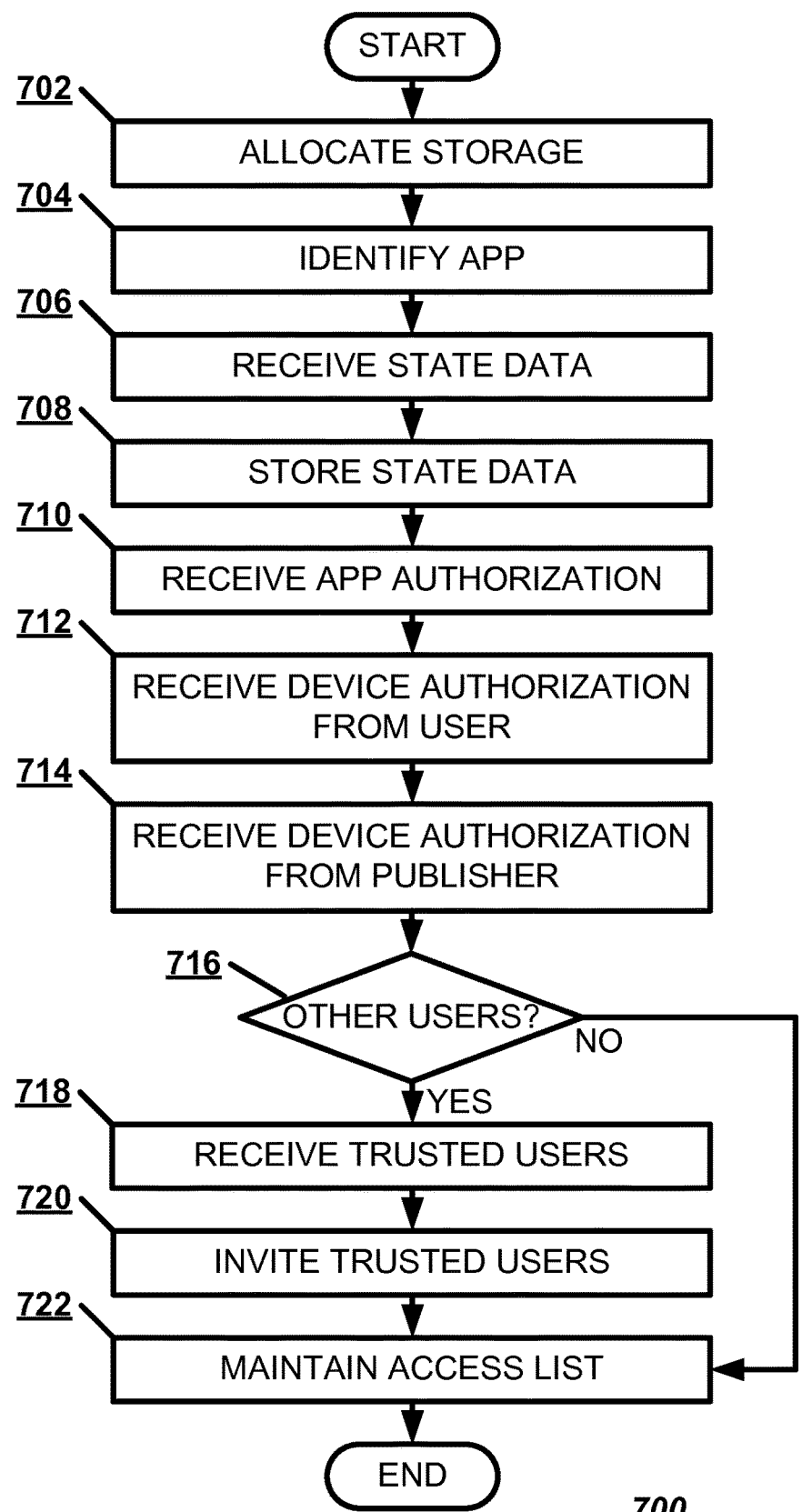
FIG. 7 illustrates, in a flowchart, one embodiment of a method of creating a state data storage location with an internet-accessible resource service.

FIG. 7 illustrates, in a flowchart, one embodiment of a method 700 of creating a state data storage location with an internet-accessible resource service 122. The internet-accessible resource service 122 may allocate a data location for an application state data set of an application (Block 702). The internet-accessible resource service 122 may identify the application using a trusted source application identifier (Block 704). The internet-accessible resource service 122 may receive the application state data set for the application (Block 706). The internet-accessible resource service 122 may store the application state data set for an application (Block 708). The internet-accessible resource service 122 may receive an application authorization from a user, indicating applications authorized to access the application state data set (Block 710). The internet-accessible resource service 122 may receive a device authorization from the user, indicating devices the user authorizes to access the application state data set (Block 712). The internet-accessible resource service 122 may receive a device authorization from an application publisher, indicating devices the application publisher authorizes to access the application state data set (Block 714). If the user has granted access to the application state data to other users (Block 716), the internet-accessible data storage 124 may receive a trusted user list 430 from the user for inclusion in the access control list (Block 718). The internet-accessible data storage 124 may invite a trusted user to access the application state data (Block 720). The internet-accessible resource service 122 may maintain an access control list for the application state data set (Block 722).

Figure 8:
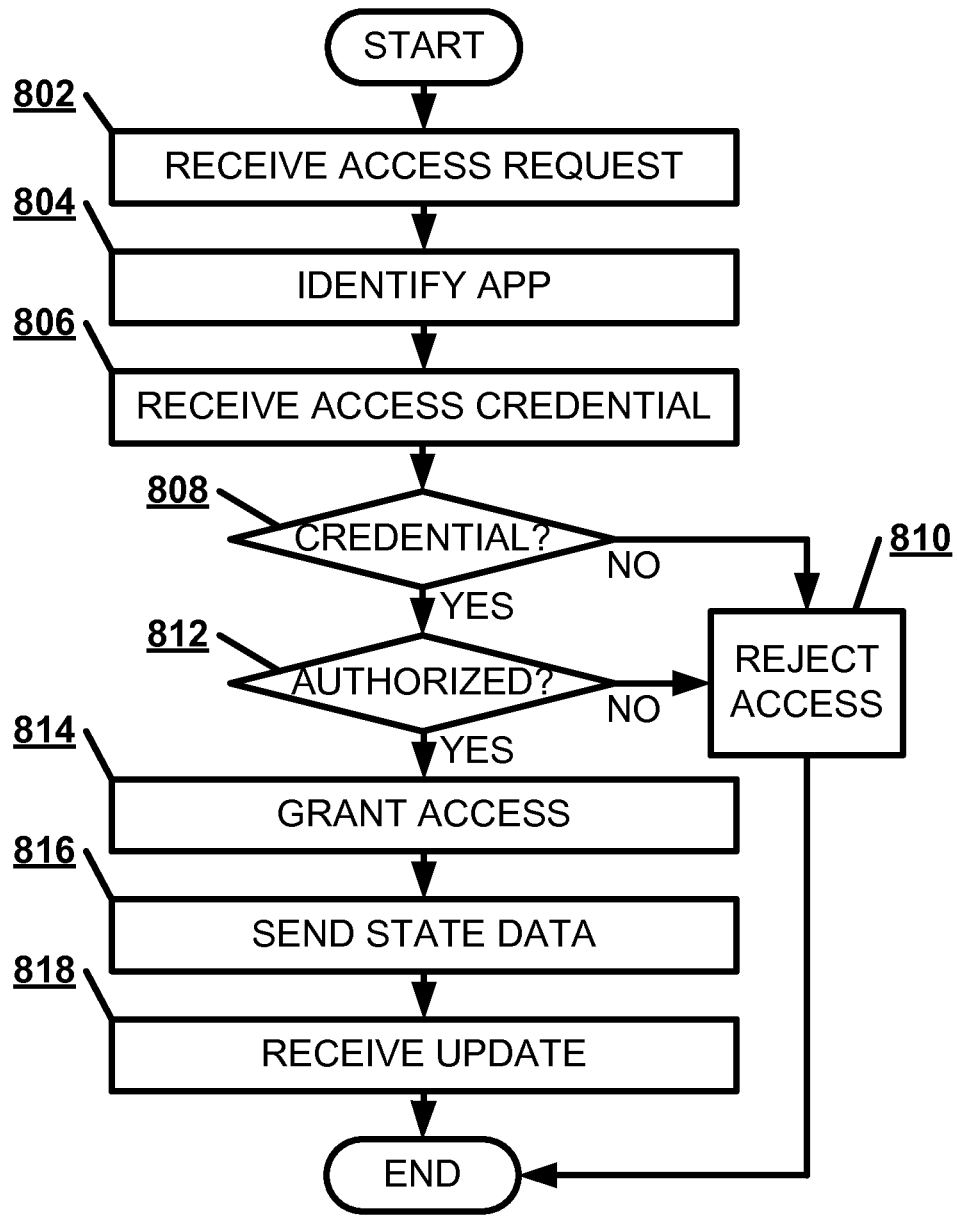
FIG. 8 illustrates, in a flowchart, one embodiment of a method of processing an access request with an internet-accessible resource service.

FIG. 8 illustrates, in a flowchart, one embodiment of a method 800 of processing an access request with an internet-accessible resource service. The internet-accessible resource service 122 may receive an access request 300 for the application state data set from an untrusted platform 142 on a target user device 140 (Block 802). The internet-accessible resource service 122 may identify the application using a trusted source application identifier 320 (Block 804). The internet-accessible resource service 122 may receive an access credential 330 for the untrusted platform 142 on the target user device 140 identifying a trusted user (Block 806). If the access credential 330 for the access request 300 is invalid (Block 808), the internet-accessible resource service 122 may reject the access request based on the access credentials 300 (Block 810). If the target user device 140 is not authorized to access the application state data set (Block 812), the internet-accessible resource service 122 may reject the access request based on a device authorization 440 (Block 810). Otherwise, the internet-accessible resource service 122 may grant access to the application state data set (Block 814). The internet-accessible resource service 122 may send the application state data set to the untrusted platform 142 on the target user device 140 (Block 816). The internet-accessible resource service 122 may receive an updated application state data set from the untrusted platform 142 on the target user device 140 (Block 818).

Figure 9:
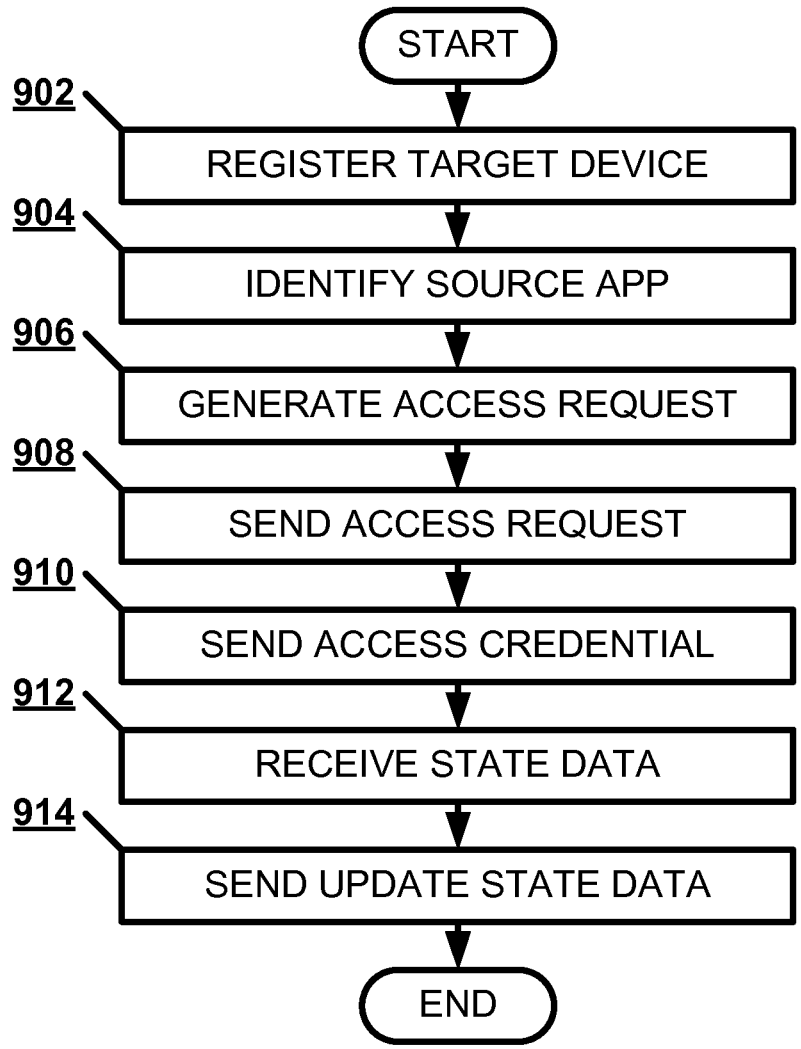
FIG. 9 illustrates, in a flowchart, one embodiment of a method of accessing an application state data set with a source application.

FIG. 9 illustrates, in a flowchart, one embodiment of a method 900 of accessing an application state data set with a target application 144 of the target user device 140. The target user device 140 may register with the internet-accessible data storage 124 (Block 902). The target user device 140 may identify the source application 114 using a trusted source application identifier 320 (Block 904). The untrusted platform 142 of the target user device 140 may generate an access request 300 for an application state data set for a source application 114 (Block 906). The target user device 140 may send the access request 300 to an internet-accessible data storage 124 (Block 908). The target user device 140 may send an access credential to the internet-accessible data storage 124 identifying a trusted user (Block 910). The target user device 140 may receive the application state data set from the internet-accessible data storage 124 (Block 912). The target user device 140 may send an updated application state data set to the internet-accessible data storage 124 (Block 914).

Figure 10:
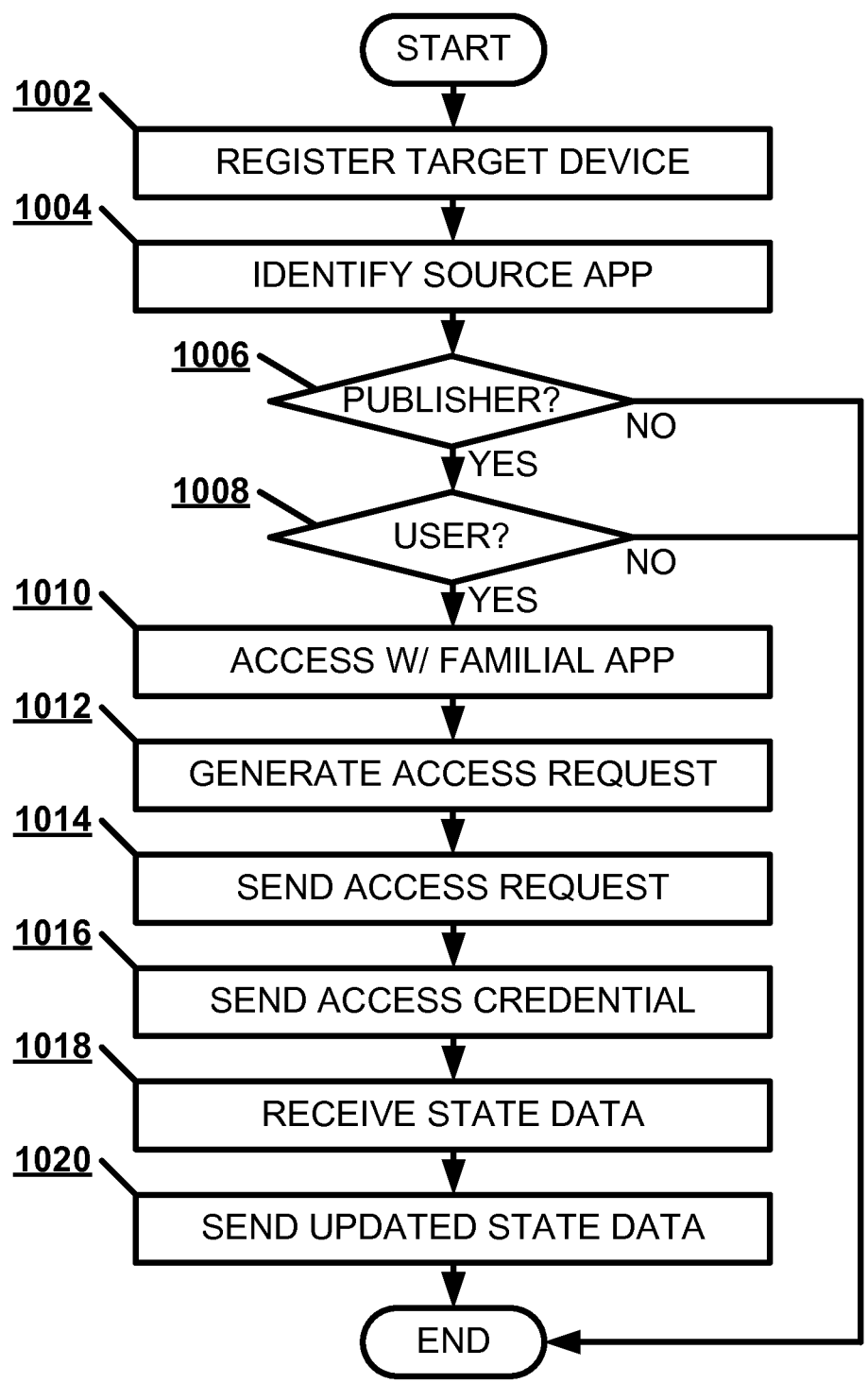
FIG. 10 illustrates, in a flowchart, one embodiment of a method of accessing an application state data set with a familial application.

FIG. 10 illustrates, in a flowchart, one embodiment of a method 1000 of accessing an application state data set with a familial application 146. The target user device 140 may register with the internet-accessible data storage 124 (Block 1002). The target user device 140 may identify the source application 114 using a trusted source application identifier 320 (Block 1004). If the familial application 144 is authorized using a source publisher identifier (Block 1006) and has received a user authorization for a familial application to access the application state data set (Block 1008), the target user device 140 may access the application state data set with a familial application 144 (Block 1010). The untrusted platform 142 of the target user device 140 may generate an access request 300 for an application state data set for a source application 114 (Block 1012). The target user device 140 may send the access request 300 to an internet-accessible data storage 124 (Block 1014). The target user device 140 may send an access credential to the internet-accessible data storage 124 (Block 1016). The target user device 140 may receive the application state data set from the internet-accessible data storage 124 (Block 1018). The target user device 140 may send an updated application state data set to the internet-accessible data storage 124 (Block 1020).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
identifying a source application from an application publisher using a trusted source application identifier provided by a digital online platform for distributing application software functioning as an application store, wherein an internet-accessible data storage verifies an application store identity of the application store;
generating at a first operating system executed by a target user device an access request using the trusted source application identifier to identify an application state data set for the source application executed on a second operating system at a source device, wherein application store verifies an operating system identity for the second operating system and has not verified the operating system identity for the first operating system;
sending the access request to the internet-accessible data storage storing the application state data set for the source application; and
sending an access credential verifying the access request to the internet-accessible data storage.

2. The method of claim 1, further comprising:
receiving the application state data set from the internet-accessible data storage.

3. The method of claim 1, further comprising:
sending an updated application state data set to the internet-accessible data storage.

4. The method of claim 1, further comprising:
authorizing a familial application using a source publisher identifier.

5. The method of claim 1, further comprising:
receiving a user authorization for a familial application to access the application state data set.

6. The method of claim 1, further comprising:
registering the target user device with the internet-accessible data storage.

7. A tangible machine-readable medium having a set of instructions detailing a method stored thereon that when executed by one or more processors cause the one or more processors to perform the method, the method comprising:
storing in an internet-accessible data storage an application state data set for a source application executed on a source device;
identifying the source application using a trusted source application identifier provided by a digital online platform for distributing application software functioning as an application store, wherein the internet-accessible data storage has verified an application store identity of the application store; and receiving an access request using the trusted source application identifier to identify the application state data set from an operating system on a target user device, wherein the application store has not verified an operating system identity of the operating system.

8. The tangible machine-readable medium of claim 7, wherein the method further comprises:
sending the application state data set to the operating system on the target user device.

9. The tangible machine-readable medium of claim 7, wherein the method further comprises:
receiving an access credential for the operating system on the target user device identifying a trusted user.

10. The tangible machine-readable medium of claim 7, wherein the method further comprises:
rejecting the access request based on a device authorization.

11. The tangible machine-readable medium of claim 7, wherein the method further comprises:
receiving a device authorization from a user.

12. The tangible machine-readable medium of claim 7, wherein the method further comprises:
receiving an application authorization from a user.

13. The tangible machine-readable medium of claim 7, wherein the method further comprises:
receiving a device authorization from an application publisher.

14. The tangible machine-readable medium of claim 7, wherein the method further comprises:
maintaining an access control list for the application state data set.

15. The tangible machine-readable medium of claim 7, wherein the method further comprises:
receiving an updated application state data set from the operating system on the target user device.

16. A target user device, comprising:
a memory configured to identify a source application using a trusted source application identifier provided by a digital online platform for distributing application software functioning as an application store, wherein an internet-accessible data storage has verified an application store identity of the application store;
a processor configured to execute a target application on an operating system, wherein the application store has not verified an operating system identity of the operating system; and
a communication interface configured to send to the internet-accessible data storage an access request using the trusted source application identifier to identify an application state data set for a source application produced by a source publisher executed on a source device from the operating system on the target user device with an access credential.

17. The target user device claim 16, wherein the processor is configured to access the application state data set with a familial application.

18. The target user device claim 16, wherein the processor is configured to authorize a familial application using a source publisher identifier.

19. The target user device claim 16, further comprising:
a user input configured to receive a user authorization for a familial application to access the application state data set.

20. The target user device claim 16, wherein the communication interface is configured to register the target user device with the internet-accessible data storage.

* * * * *